US012725968B2

(12) United States Patent
Saito

(10) Patent No.: US 12,725,968 B2
(45) Date of Patent: Sep. 1, 2026

(54) CONNECTOR

(71) Applicant: Yazaki Corporation, Tokyo (JP)

(72) Inventor: Hideki Saito, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 371 days.

(21) Appl. No.: 18/441,234

(22) Filed: Feb. 14, 2024

(65) Prior Publication Data

US 2024/0291196 A1 Aug. 29, 2024

(30) Foreign Application Priority Data

Feb. 24, 2023 (JP) ................................ 2023-027269

(51) Int. Cl.
*H01R 13/62* (2006.01)
*H01R 13/627* (2006.01)

(52) U.S. Cl.
CPC ................................ *H01R 13/6271* (2013.01)

(58) Field of Classification Search
None
See application file for complete search history.

(56) References Cited

U.S. PATENT DOCUMENTS 6,824,417 B1 * 11/2004 Nimura ................ H01R 13/641
439/352
2016/0118741 A1 4/2016 Schmidt et al.
2020/0136311 A1 4/2020 Narama

FOREIGN PATENT DOCUMENTS

JP 2020-72013 A 5/2020

* cited by examiner

*Primary Examiner* — Ross N Gushi
(74) *Attorney, Agent, or Firm* — Sughrue Mion, PLLC

(57) ABSTRACT

A housing 11*a* of a connector body 11 of a connector 1 includes: a mating locking arm 112*d* that is deflection-deformable toward a CPA movement surface 112*a* and configured such that, during mating with the mating connector, a portion of the mating connector locks to a locking portion provided on an intermediate portion while deflecting the intermediate portion; and a restriction protrusion 112*f* protruding, from the intermediate portion of the mating locking arm 112*d* to the CPA movement surface 112*a*, by an amount of protrusion that does not hinder deflection deformation of the mating locking arm 112*d* during the mating, and configured such that, when excessive deflection exceeding the deflection deformation during the mating is likely to occur, a tip portion 112*f*-1 comes into contact with the CPA movement surface 112*a* to restrict the excessive deflection.

8 Claims, 9 Drawing Sheets

CONNECTOR

TECHNICAL FIELD

The present invention relates to a connector in which a Connector Position Assurance (CPA) member can be attached to a connector body to ensure mating with a mating connector.

BACKGROUND

Conventionally, a connector is known in which a CPA member is attached to the connector body to ensure mating with a mating connector (for example, see Patent Document 1). The CPA member of Patent Document 1 can be attached to a housing in a temporarily locked state, and movement in the mating direction is inhibited before mating. Then, when the connector body and the mating connector are mated together, the inhibition of the CPA member is released to allow the CPA member to move. When the mating is completed, a worker moves the movable CPA member to transition into the fully locked state. In this connector, since the CPA member is in the fully locked state, mating with the mating connector is guaranteed.

Here, the above-described connector is provided with a mating locking arm for locking during mating with the mating connector. At the time of mating, a part of the mating connector locks to a locking portion provided in an intermediate portion of the mating locking arm while deflecting the intermediate portion. In the above connector, a CPA-receiving space for receiving and attaching a CPA member is defined between the mating locking arm and a CPA movement surface facing the mating locking arm.

RELATED ART

Patent Document

Patent Document 1: JP 2020-072013 A

SUMMARY OF THE INVENTION

Problem to be Solved by the Invention

By the way, the above connector can also be used without attaching a CPA member. When used without this CPA member, the CPA-receiving space of the connector will be empty. In this situation, if an external force that causes deflection to the inside of the CPA-receiving space is applied to the mating locking arm, the amount of deflection tends to increase due to the absence of the CPA member. If this deflection in the mating locking arm becomes too large, exceeding the elasticity of the mating locking arm, this may cause irreversible deformation of the mating locking arm, which is not preferable.

Therefore, the present invention focuses on the above-mentioned problems, and it is an object to provide a connector that can alleviate deflection of the mating locking arm when used without a CPA member.

Solution to Problem

In order to solve the above problems a connector includes a connector body in which a connector terminal is accommodated in a cavity of a housing; and a CPA member that can be attached to the housing in a temporarily locked state and configured to, when attached, inhibit movement in a movement direction along a mating direction before mating of the connector body with a mating connector, the CPA member being configured to, when the inhibition is released by the mating, transition to a fully locked state by moving in the movement direction, so that the CPA member guarantees the mating, wherein the housing includes: a housing body provided with the cavity; a CPA-receiving portion that defines, of an outer peripheral surface of the housing body, a CPA-receiving space for receiving the CPA member, with a bottom surface of the CPA-receiving space being a CPA movement surface on which the CPA member moves, the CPA member temporarily locking to the CPA-receiving portion in the temporarily locked state; a mating locking arm being an arm portion that is disposed to face the CPA movement surface with the CPA-receiving space interposed therebetween and extends in the mating direction, an intermediate portion in an extending direction of the mating locking arm being deflection-deformable toward the CPA movement surface, wherein, during mating with the mating connector, a portion of the mating connector locks to a locking portion provided on the intermediate portion while deflecting the intermediate portion, and the CPA member makes a full lock with the mating locking arm; and a restriction protrusion protruding, from the intermediate portion of the mating locking arm to the CPA movement surface, by an amount of protrusion that does not hinder deflection deformation of the mating locking arm during the mating, wherein when excessive deflection exceeding the deflection deformation during the mating is likely to occur, a tip portion of the restriction protrusion comes into contact with the CPA movement surface to restrict the excessive deflection.

Advantageous Effects of the Invention

According to the above-described connector, deflection of the mating locking arm when used without a CPA member can be alleviated.

DETAILED DESCRIPTION OF THE EXEMPLARY EMBODIMENT

An embodiment of a connector will be described below.

Figure 1:
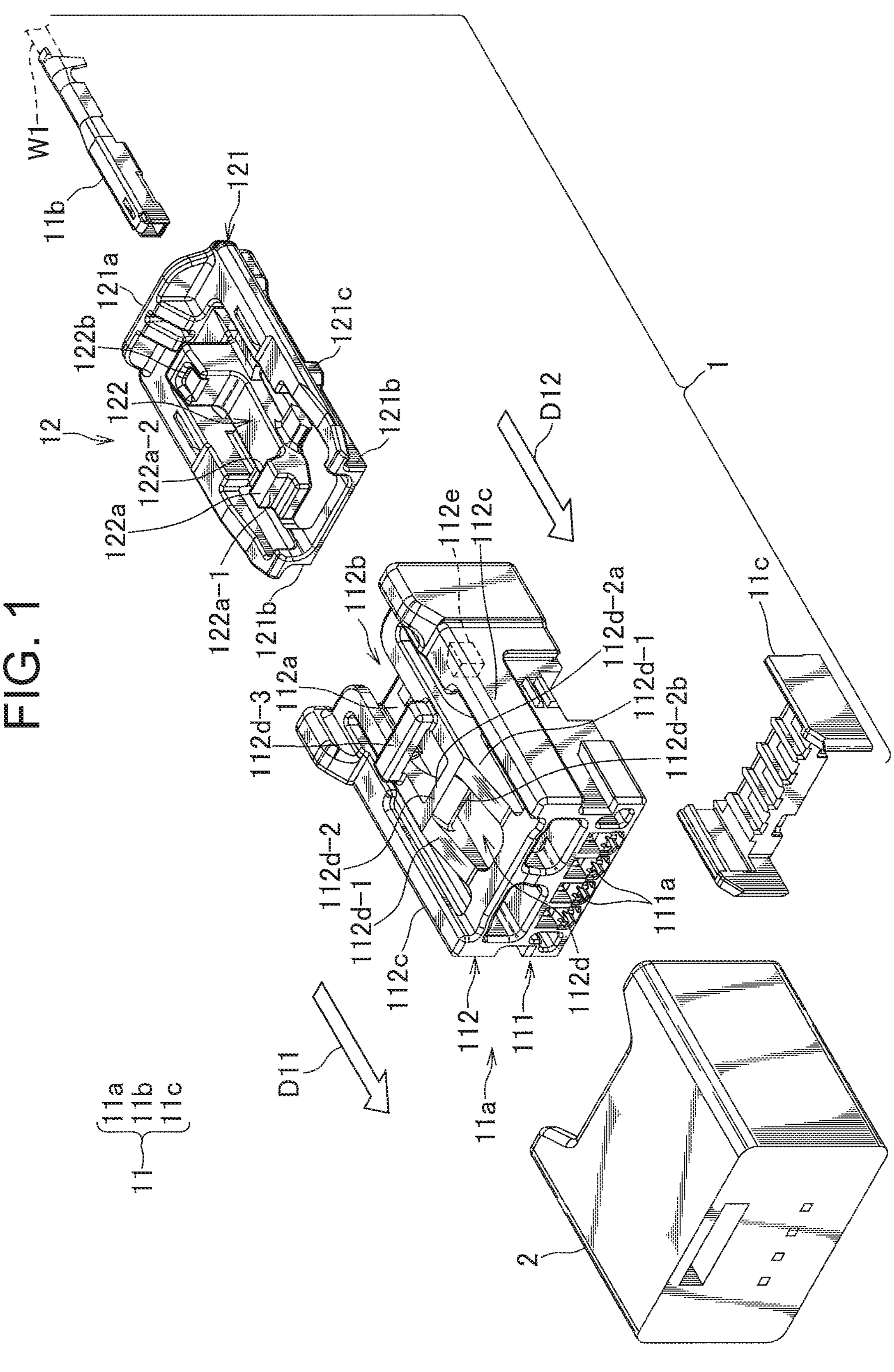
FIG. 1 is an exploded perspective view illustrating a connector according to an embodiment as well as a mating connector.

FIG. 1 is an exploded perspective view illustrating a connector 1 according to an embodiment as well as a mating connector 2.

The connector 1 according to the present embodiment is used, for example, as an end connector of a wire harness mounted on a vehicle or the like. The mating connector 2 is provided in a mating device or a mating wire harness to which the wire harness in question is connected. Further, in the present embodiment, the connector 1 is a female connector having an appearance of a rectangular block shape, and the mating connector 2 is a male connector in a rectangular block shape, to which the connector 1 can be connected.

The connector 1 includes a connector body 11 and a CPA member 12. The connector body 11 has connector terminals 11*b* housed in cavities 111*a* of a housing 11*a*. The housing 11*a* is a member made of insulating resin that has an appearance of a rectangular block shape and has the multiple rectangular cylindrical cavities 111*a* formed inside. The connector terminal 11*b* is a female terminal made of a conductive metal that is crimped and connected to an end of an electric wire W1 and formed into a rectangular tube shape by sheet metal processing. A single connector terminal 11*b* is housed in each of the cavities 111*a* of the housing 11*a*.

Furthermore, the connector body 11 includes a spacer 11*c*. The spacer 11*c* is a member made of insulating resin that is inserted through a slit formed on one side of a housing body 111 in a rectangular block shape. When this spacer 11*c* is inserted into the housing body 111, the connector terminal 11*b* in each cavity 111*a* is pressed in the insertion direction, and each connector terminal 11*b* is fixed so as not to come out of the cavity 111*a*.

A CPA member 12 is a resin member that is attached to the housing body 111 in the temporarily locked state, and after the connector body 11 is mated to the mating connector 2, shifts to the fully locked state to ensure the mating. Before the connector body 11 is mated to the mating connector 2, the CPA member 12 is inhibited from moving in a movement direction D12 along the mating direction D11, and this inhibition is released upon mating. When the mating of the connector body 11 to the mating connector 2 is completed, the worker confirms the mating by pushing the CPA member 12 in the movement direction D12 to shift to the fully locked state.

The housing 11*a* in the connector body 11 includes: the housing body 111 in which the cavities 111*a* are provided; and a CPA-receiving portion 112 that receives the CPA member 12. The CPA-receiving portion 112 defines, on the outer peripheral surface of the housing body 111, a CPA-receiving space 112*b* that receives the CPA member 12, with a bottom surface of the CPA-receiving space 112*b* being a CPA movement surface 112*a* on which the CPA member 12 moves. This CPA-receiving portion 112 includes a pair of side wall ribs 112*c* that is erected on a pair of side edges, along the movement direction D12, of the CPA movement surface 112*a*, and a mating locking arm 112*d* is provided to extend between the side wall ribs 112*c* to face the CPA movement surface 112*a*.

The mating locking arm 112*d* is an arm portion that is disposed to face the CPA movement surface 112*a* with the CPA-receiving space 112*b* interposed therebetween and extends in the mating direction D11, i.e., the movement direction D12 of the CPA member 12. In the mating locking arm 112*d*, a rear side in the movement direction D12 is connected to the pair of side wall ribs 112*c*, a front side is connected to the CPA movement surface 112*a*, and a central part is configured to be deflection-deformable. The mating locking arms 112*d* includes arm portions 112*d*-1, constituting a pair, each extending along the side wall ribs 112*c*, the arm portions 112*d*-1 being connected, on the rear side in the movement direction D12, to the side wall ribs 112*c*, and the arm portions 112*d*-1 being connected, on the front side in the movement direction D12, to the CPA movement surface 112*a* at positions closer to the side wall ribs 112*c*. A locking bridge 112*d*-2 (locking portion) connects the central portions of the arm portions 112*d*-1 constituting the pair. During mating with the mating connector 2, the mating connector 2 is locked to a locking end face 112*d*-2*a*, which is an end face of the locking bridge 112*d*-2 on the rear side in the movement direction D12, so that the mating state is stabilized.

Furthermore, on the rear side of the locking bridge 112*d*-2, i.e., on the opposite side from the mating side as seen from the locking bridge 112*d*-2, a lock release operation-receiving portion 112*d*-3 is provided, in the form of a bridge, between the arm portions 112*d*-1 constituting the pair. During releasing of mating, a worker performs a lock release operation on the lock release operation-receiving portion 112*d*-3 to detach the locking end face 112*d*-2*a* from the mating connector 2 by deflecting the mating locking arm 112*d*. The lock release operation-receiving portion 112*d*-3 is formed such that the height of the lock release operation-receiving portion 112*d*-3 from the CPA movement surface 112*a* is greater than the height of the locking bridge 112*d*-2, so that the worker can readily perform the lock release operation.

The CPA member 12 is a member having an appearance of a generally rectangular plate shape, and is inserted into the CPA-receiving space 112*b* such that it is introduced between the CPA movement surface 112*a* and the mating locking arm 112*d* in the CPA-receiving portion 112. Before mating with the mating connector 2, the CPA member 12 will be in the temporarily locked state explained below in the CPA-receiving space 112*b*.

First, the CPA member 12 has a CPA body 121 formed in a rectangular frame shape and provided with a full lock operation-receiving portion 121*a*, on the rear side in the movement direction D12 along the mating direction D11, for receiving a transition operation to the fully locked state. CPA-side temporary locking protrusions 121*c* for temporarily locking to the housing are provided on the outer surfaces of the side frame portions 121*b*, constituting a pair, that are provided along the movement direction D12 of the CPA body 121. In the CPA-receiving portion 112 of the housing 11*a*, housing-side temporary locking protrusions 112*e* to which the CPA-side temporary locking protrusions 121*c* lock are provided on the inner surfaces of the side wall ribs 112*c* constituting the pair. When the pair of CPA-side temporary locking protrusions 121*c* lock to the pair of housing-side temporary locking protrusions 112*e*, the CPA body 121, thus the CPA member 12, temporarily locks to the housing 11*a*.

Furthermore, the CPA member 12 includes a CPA arm 122 in a cantilever shape extending inside the rectangular frame-shaped CPA body 121 in the movement direction D12. The rear side of the CPA arm 122 in the movement direction D12 is a fixed end, and the front side is a free end. An end portion protrusion 122*a* protruding toward the side opposite from the CPA movement surface 112*a* is formed on the end portion of the CPA arm 122 on the free end side. Before mating, a movement inhibition end face 122*a*-1, which is the end face of the end portion protrusion 122*a* on the front side in the in the movement direction D12, comes into contact with the locking end face 112*d*-2*a* of the mating locking arm 112*d* of the housing 11*a*. Due to the movement inhibition end face 122*a*-1 coming into contact with the locking end face 112*d*-2*a*, the CPA arm 122 inhibits the CPA member 12, in the temporarily locked state before mating, from moving in the movement direction D12.

When the mating connector 2 is mated, this mating connector 2 pushes the end portion protrusion 122*a* toward the CPA movement surface 112*a*, and the movement inhibition end face 122*a*-1 comes out of contact with the locking end face 112*d*-2*a*, so that the movement inhibition in the temporarily locked state is released. Then, when the worker puts his finger on the full lock operation-receiving portion 121*a* and pushes the CPA member 12 in the movement direction D12, the end portion protrusion 122*a* of the CPA arm 122 passes under the locking bridge 112*d*-2 of the mating locking arm 112*d* to the front side in the movement direction D12. When the CPA arm 122 springs back upon passing under the locking bridge 112*d*-2, the full lock end face 122*a*-2, i.e., the end face of the end portion protrusion 122*a* on the rear side in the movement direction D12, locks to the full lock-receiving portion 112*d*-2*b*, i.e., the end portion of the locking bridge 112*d*-2 on the front side in the movement direction D12. The fully locked state of the CPA member 12 with respect to the housing 11*a* means a state in which the full lock end face 122*a*-2 of the CPA arm 122 locks to the full lock-receiving portion 112*d*-2*b* of the mating locking arm 112*d*. As described above, when the movement inhibition is released due to mating of the mating connector 2, the CPA arm 122 fully locks to the housing 11*a*.

The CPA arm 122 has a full lock release-receiving portion 122*b* formed in a protruding manner at an intermediate position between the fixed end side and the free end side, on the outer surface opposite from the CPA movement surface 112*a*. The full lock release-receiving portion 122*b* is a portion on which the worker performs a full lock release operation to deflect the CPA arm 122 to release the full lock of the full lock end face 122*a*-2 in the fully locked state. In the full lock release operation, the worker pushes the full lock release-receiving portion 122*b* toward the CPA movement surface 112*a*, so that the full lock end face 122*a*-2 comes out of contact with the full lock-receiving portion 112*d*-2*b* to release the full lock.

Here, the connector 1 described above can be used without the CPA member 12, i.e., without attaching the CPA member 12 to the CPA-receiving portion 112. In this case, for example, an external force may be applied to the lock release operation-receiving portion 112*d*-3 of the connector 1 during transportation, which may cause the mating locking arm 112*d* to deflect into the CPA-receiving space 112*b* which is empty. In the present embodiment, the following configuration is provided in the housing 11*a* in order to alleviate the deflection of the mating locking arm 112*d* when such an external force is applied.

Figure 2:
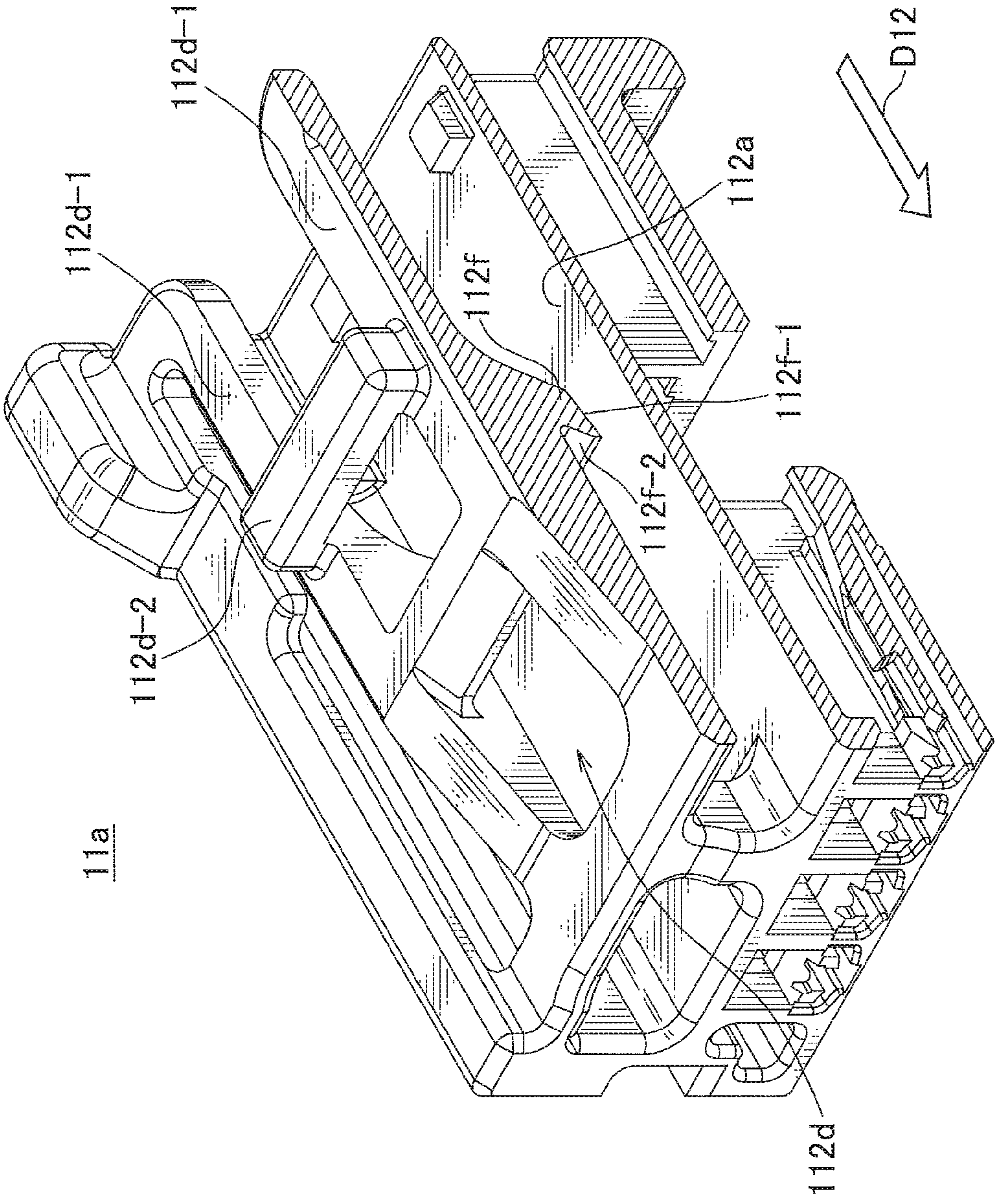
FIG. 2 is a cutaway perspective view of the housing illustrated in FIG. 1, cut to illustrate a cross section passing through a structure for alleviating deflection of a mating locking arm.
Figure 3:
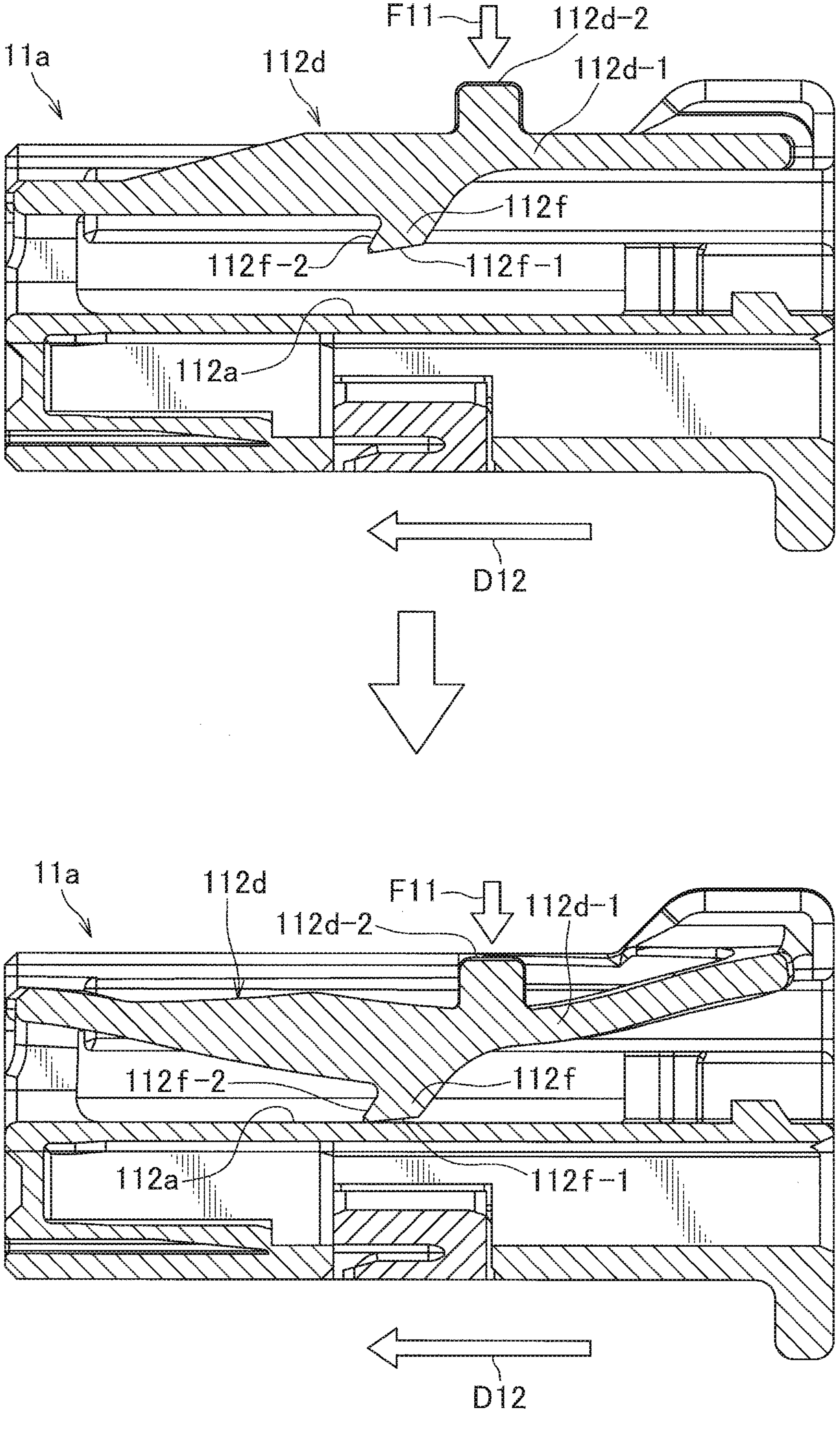
FIG. 3 is a sectional view, corresponding to the cross section illustrated in the cutaway perspective view of FIG. 2, illustrating how the deflection of the mating locking arm is alleviated in the housing illustrated in FIG. 2.
Figure 4:
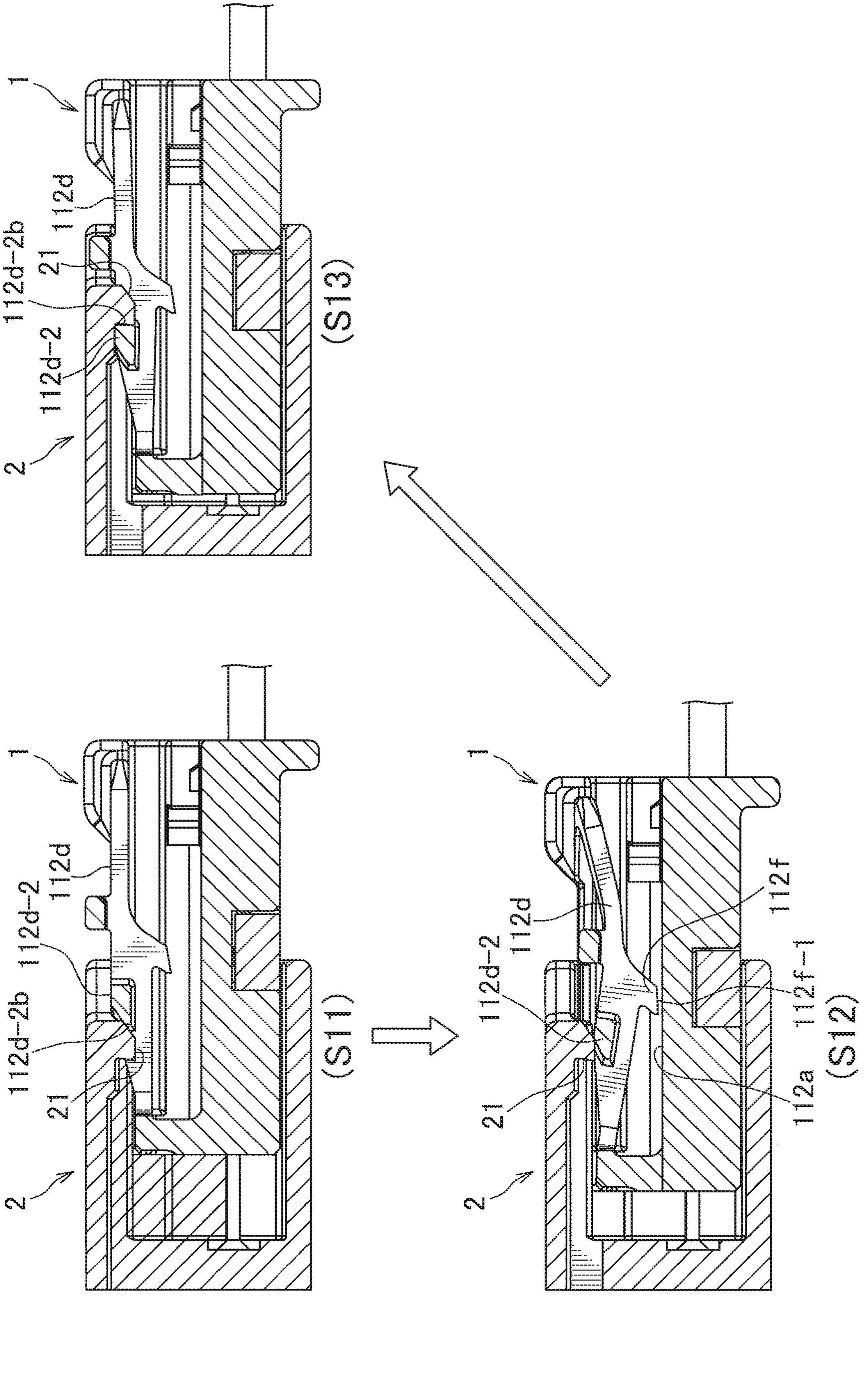
FIG. 4 is a sectional view taken along a plane that passes a locking portion of the mating connector during mating to illustrate the connector illustrated in FIG. 1 as to how the mating connector is mated without a CPA member.

FIG. 2 is a cutaway perspective view of the housing illustrated in FIG. 1, cut to illustrate a cross section passing through a structure for alleviating deflection of the mating locking arm. FIG. 3 is a sectional view, corresponding to the cross section illustrated in the cutaway perspective view of FIG. 2, illustrating how the deflection of the mating locking arm is alleviated in the housing illustrated in FIG. 2. FIG. 4 is a sectional view taken along a plane that passes a locking portion of the mating connector during mating to illustrate the connector illustrated in FIG. 1 as to how the mating connector is mated without a CPA member.

In the housing 11*a* according to the present embodiment, the mating locking arm 112*d* is provided with restriction protrusions 112*f* for alleviating deflection. The restriction protrusions 112*f* are portions that protrude toward the CPA movement surface 112*a* from the intermediate portion in the extending direction (i.e., the movement direction D12) of the mating locking arm 112*d*. At this time, the amount of protrusion of the restriction protrusions 112*f* is such that the restriction protrusions 112*f* do not hinder the deflection deformation of the mating locking arm 112*d* during mating. When excessive deflection exceeding the deflection deformation during mating is likely to occur, the tip portion 112*f*-1 comes into contact with the CPA movement surface 112*a* to restrict the excessive deflection.

Furthermore, in the present embodiment, totally one pair of such restriction protrusions 112*f* is provided, one restriction protrusion 112*f* being provided for each of the arm portions 112*d*-1 of the mating locking arm 112*d*. In the vicinity of the lock release operation-receiving portion 112*d*-2 at approximately the center, in the movement direction D12, of each of the arm portions 112*d*-1, each of the restriction protrusions 112*f* protrudes toward the CPA movement surface 112*a* from the edge on the side of the CPA movement surface 112*a*. A housing-side-inclined surface 112*f*-2 the distance of which from the mating locking arm 112*d* increases toward the movement direction D12 is formed on the front side, in the movement direction D12, of each of the restriction protrusions 112*f*. Each of the restriction protrusions 112*f* is such that the housing-side-inclined surface 112*f*-2, together with the mating locking arm 112*d*, form a hook shape.

In the example of FIG. 3, an external force F11 that deflects the mating locking arm 112*d* toward the CPA movement surface 112*a* is applied to the lock release operation-receiving portion 112*d*-2 that protrudes more greatly than other parts of the mating locking arm 112*d*. Although this external force F11 causes the mating locking arm 112*d* to deflect toward the CPA movement surface 112*a*, the tip portion 112*f*-1 of the restriction protrusion 112*f* comes into contact with the CPA movement surface 112*a*, so that the amount of deflection is restricted from becoming excessive.

In the example as illustrated in FIG. 4, when the connector 1 mates with the mating connector 2, the restriction protrusions 112*f* do not prevent the mating locking arm 112*d* from deflecting when the mating-side lock portion 21, which is a part of the mating connector 2, locks to the locking end face 112*d*-2*a*. In the first step S11 of FIG. 4, the mating-side lock portion 21 is in contact with the full lock-receiving portion 112*d*-2*b* of the locking bridge 112*d*-2. In this state, the mating locking arm 112*d* is not yet deflected.

In a second step S12 in which mating of the mating connector 2 to the connector 1 has progressed slightly, the mating-side lock portion 21 passes over the locking bridge 112d-2 while deflecting the mating locking arm 112d toward the CPA movement surface 112a. At this second step S12, the amount of deflection of the mating locking arm 112d at the time of mating reaches its maximum. The amount of protrusion of the restriction protrusions 112f is such that the tip portions 112f-1 do not come into contact with the CPA movement surface 112a in the second step S12. Since the restriction protrusions 112f are formed with such a protruding amount, the deflection deformation of the mating locking arm 112d during mating is not hindered.

In a third step S13 in which mating of the mating connector 2 with the connector 1 is completed, the mating-side lock portion 21 passes over the locking bridge 112d-2 and locks to the locking end face 112d-2a. The deflection of the mating locking arm 112d has been resolved.

The CPA member 12 that can be attached to the connector 1 has the following configuration that utilizes the restriction protrusions 112f on the side of the housing 11a.

Figure 5A:
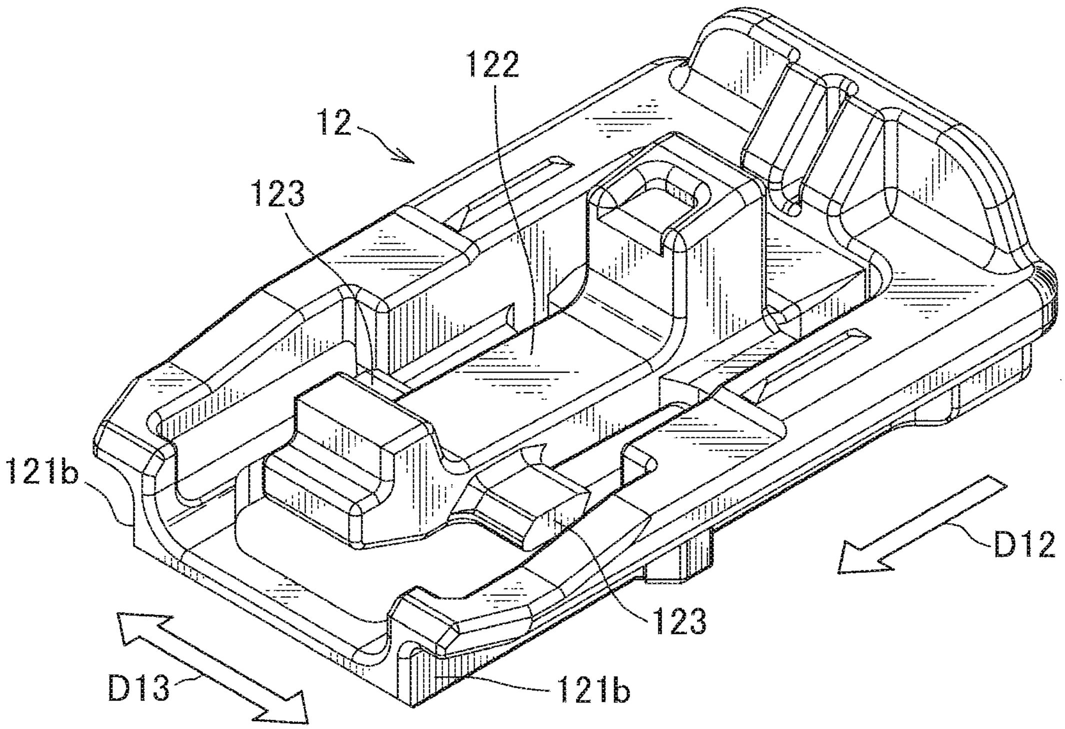
FIGS. 5A and 5B are perspective views of the CPA member illustrated in FIG. 1, as seen from both the top and bottom sides.
Figure 5B:
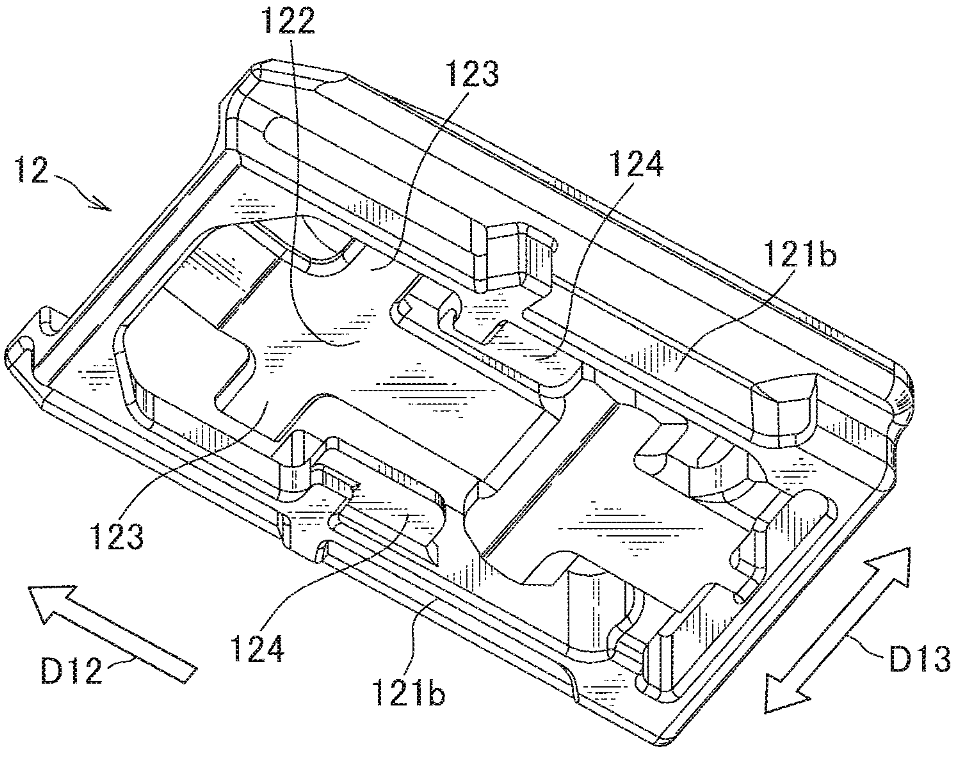

FIGS. 5A and 5B are perspective views of the CPA member illustrated in FIG. 1, as seen from both the top and bottom sides. FIG. 5A illustrates a perspective view of the top side of the CPA member, and FIG. 5B illustrates a perspective view of the bottom side of the CPA member. In the present embodiment, the CPA member 12 includes not only the configuration explained with reference to FIG. 1 but also CPA-side restriction protrusions 123 and erroneous operation restriction portions 124.

The CPA-side restriction protrusions 123 are portions of the CPA arm 122 that protrude in the width direction D13 of the CPA arm 122 from the intermediate position between the fixed end side and the free end side. As illustrated later, in the fully locked state, the CPA arm 122 locks to the front side, in the movement direction D12, of the restriction protrusions 112f on the side of the housing 11a to restrict return movement that is opposite to the movement direction D12. Here, in the present embodiment, the pair of restriction protrusions 112f of the housing 11a is provided such that the CPA arm 122 is interposed in the width direction D13 between the two restriction protrusions 112f. Correspondingly, the CPA-side restriction protrusions 123, constituting the pair, are provided so as to protrude in width direction D13 from the intermediate positions on the respective side edges, constituting the pair, of the CPA arm 122, and in the fully locked state, the CPA-side restriction protrusions 123 constituting the pair lock to, in a one-to-one manner, the respective restriction protrusions 112f constituting the pair.

The erroneous operation restriction portions 124 are shelf-like portions which are formed at such a position that the restriction protrusions 112f can come into contact with the erroneous operation restriction portions 124 in the fully locked state of the CPA member 12 and that the restriction protrusions 112f come out of contact with the erroneous operation restriction portions 124 in the temporarily locked state. In the temporarily locked state, the erroneous operation restriction portions 124 come out of contact with the restriction protrusions 112f, thus not hindering deflection of the mating locking arm 112d for locking the mating-side lock portion 21 of the mating connector 2 and the locking end face 112d-2a of the locking bridge 112d-2. In contrast, in the fully locked state, the erroneous operation restriction portions 124 restrict deflection of the mating locking arm 112d by causing the restriction protrusions 112f to come into contact with the erroneous operation restriction portions 124 when an erroneous operation is performed on the lock release operation-receiving portions 112d-3 before the CPA member 12 transitions to the temporarily locked state. As described above, the pair of erroneous operation restriction portions 124 is provided, corresponding to the provision of the pair of restriction protrusions 112f.

Specifically, the erroneous operation restriction portions 124 are provided on the respective side frame portions 121b, constituting the pair, of the CPA member 12. In the fully locked state of the CPA member 12, the side frame portions 121b constituting the pair are arranged such that the mating locking arm 112d is interposed between the two side frame portions 121b in a top view of the CPA movement surface 112a. The restriction protrusions 112f provided on arm portions 112d-1, constituting the pair, of the mating locking arm 112d are provided to fit in respective gaps between the CPA arm 122 and the respective side frame portions 121b constituting the pair. The erroneous operation restriction portions 124 constituting the pair extend inwardly into the above gaps from the respective side frame portions 121b constituting the pair, so that the restriction protrusions 112f constituting the pair can come into contact with the respective erroneous operation restriction portions 124 constituting the pair in the fully locked state.

The CPA member 12 as described above performs the following transformation operation from the temporarily locked state, via the mating between the connector 1 and the mating connector 2, to the fully locked state.

Figure 6:
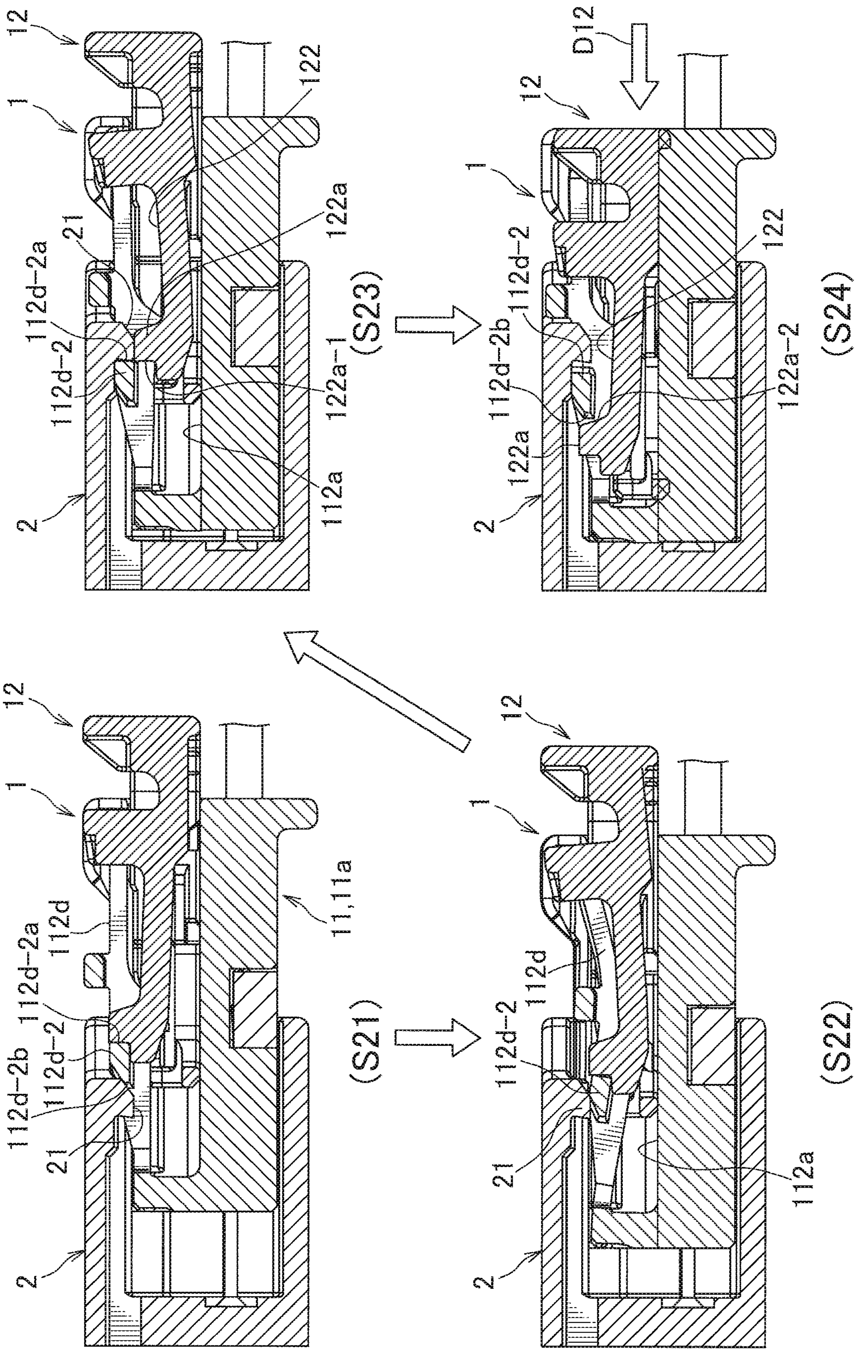
FIG. 6 illustrates sectional views, taken along a plane passing the CPA arm, illustrating movement of each portion from when the mating connector is mated to the connector illustrated in FIG. 1 to when the CPA member is transitions to a fully locked state.

FIG. 6 illustrates sectional views, taken along a plane passing the CPA arm, illustrating movement of each portion from when the mating connector is mated to the connector illustrated in FIG. 1 to when the CPA member transitions to the fully locked state.

In a first step S21 of FIG. 6, the CPA member 12 is attached to the connector body 11 of the connector 1 in the temporarily locked state. Then, mating of the mating connector 2 to the connector 1 starts. In the first step S21, the mating-side lock portion 21 of the mating connector 2 is in contact with the full lock-receiving portion 112d-2b on the opposite of the locking bridge 112d-2 from the locking end face 112d-2a.

In a second step S22 in which mating of the mating connector 2 to the connector 1 has progressed slightly, the mating-side lock portion 21 passes over the locking bridge 112d-2 while deflecting the mating locking arm 112d toward the CPA movement surface 112a. At this occasion, the tip portion is pushed by the locking bridge 112d-2, and the CPA member 12 is inclined toward the CPA movement surface 112a.

In a third step S23 in which mating of the mating connector 2 to the connector 1 is completed, the mating-side lock portion 21 passes over the locking bridge 112d-2 to lock to the locking end face 112d-2a. Then, the mating-side lock portion 21 pushes the end portion protrusion 122a of the CPA member 12, of which the movement inhibition end face 122a-1 was in contact with locking end face 112d-2a in the temporarily locked state, toward the CPA movement surface 112a while deflecting the CPA arm 122. According to this pushing, the movement inhibition end face 122a-1 comes out of contact with the locking end face 112d-2a, which releases movement inhibition of the CPA member 12.

In a fourth step S24 in which mating of the mating connector 2 with the connector 1 is completed, the CPA member 12 which has been released from the movement inhibition is pushed in the movement direction D12 to transition to the fully locked state. In the fully locked state, the end portion protrusion 122a of the CPA arm 122 passes under the locking bridge 112d-2, and the full lock end face 122*a*-2 on the rear side in the movement direction D12 locks to the full lock-receiving portion 112*d*-2*b* of the locking bridge 112*d*-2. In this fully locked state, the restriction protrusions 112*f* provided in the mating locking arm 112*d* can come into contact with the erroneous operation restriction portions 124 of the CPA member 12. The restriction protrusions 112*f* can come into contact with the erroneous operation restriction portions 124, thereby restricting the deflection of the mating locking arm 112*d* when an erroneous operation is performed on the lock release operation-receiving portion 112*d*-2.

Figure 7:
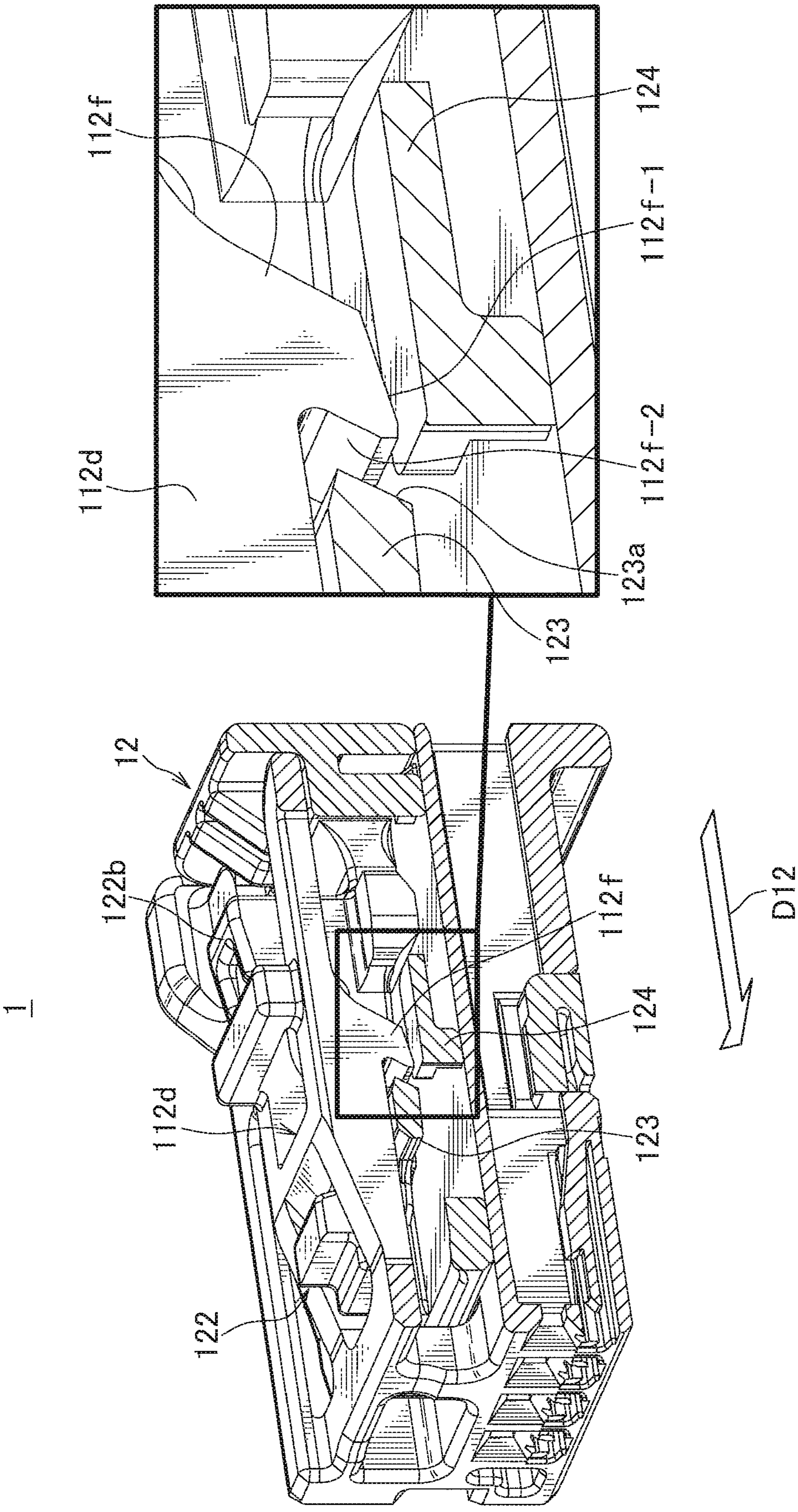
FIG. 7 is a cut perspective view of restriction protrusions and erroneous operation restriction portions to illustrate how the restriction protrusions provided on the mating locking arm can come into contact with the erroneous operation restriction portions of the CPA member when the CPA member transitions to the fully locked state in the connector.
Figure 8:
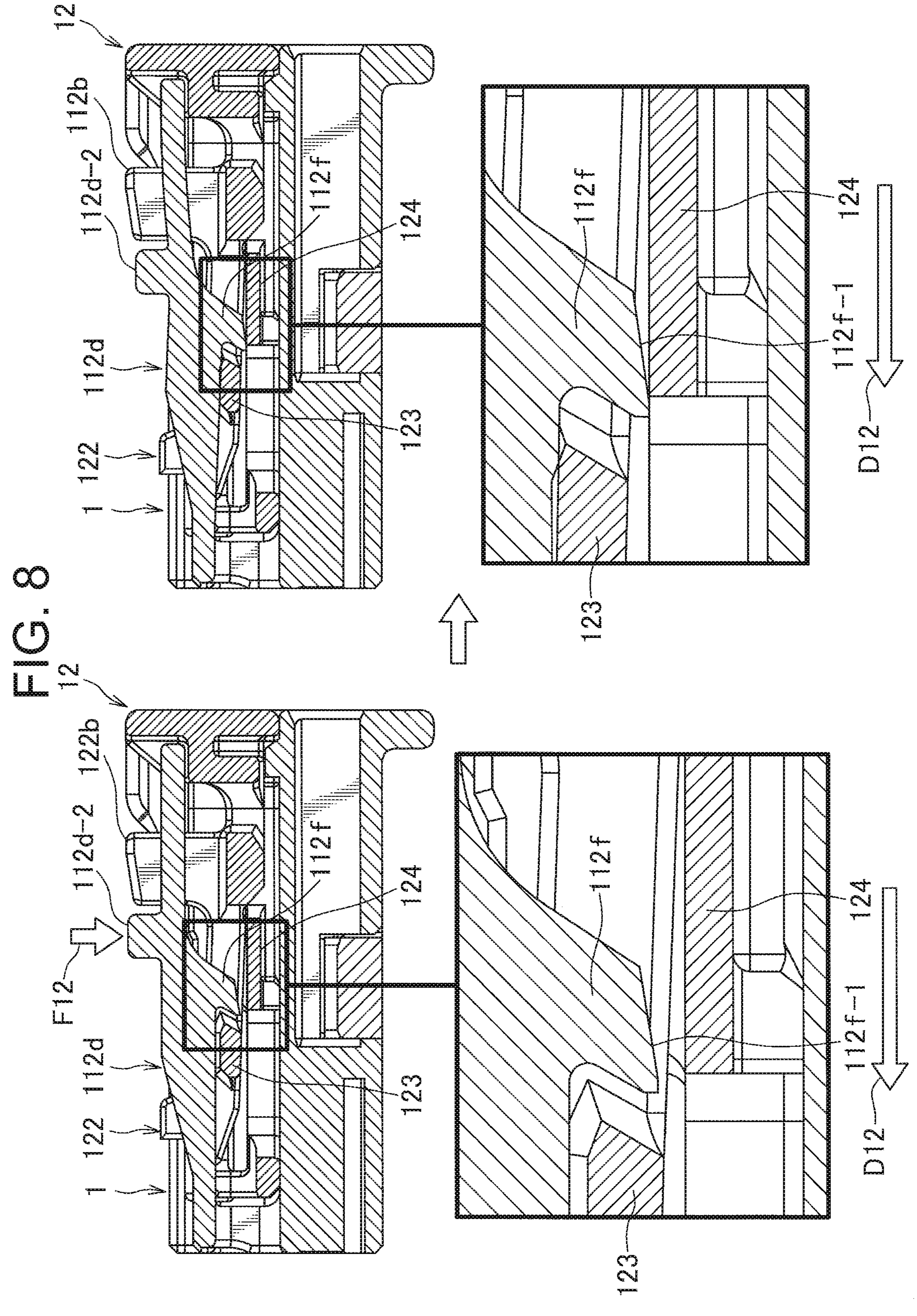
FIG. 8 is a sectional view, taken along a plane passing through the mating locking arm, illustrating that the restriction protrusions can come into contact with the erroneous operation restriction portions, and accordingly deflection of the mating locking arm is restricted when an erroneous operation is performed on the lock release operation-receiving portion.

FIG. 7 is a cut perspective view of the restriction protrusions and the erroneous operation restriction portions to illustrate how the restriction protrusions provided on the mating locking arm can come into contact with the erroneous operation restriction portions of the CPA member when the CPA member transitions to the fully locked state in the connector. FIG. 8 is a sectional view, taken along a plane passing through the mating locking arm, illustrating that the restriction protrusions can come into contact with the erroneous operation restriction portions, and accordingly deflection of the mating locking arm is restricted when an erroneous operation is performed on the lock release operation-receiving portion.

As illustrated in FIG. 7, when the CPA member 12 transitions to the fully locked state in the connector 1, the erroneous operation restriction portions 124 of the CPA member 12 are positioned immediately under the restriction protrusions 112*f* provided on the mating locking arm 112*d*. At this stage in which they are thus positioned, there are gaps between the tip portions 112*f*-1 of the restriction protrusions 112*f* and the erroneous operation restriction portions 124.

In the fully locked state as described above, as illustrated in FIG. 8, it is assumed that an erroneous operation is performed on the lock release operation-receiving portion 112*d*-2. An erroneous operation in this example of FIG. 8 is such that a pushing external force F12 is applied to the lock release operation-receiving portion 112*d*-2 that protrudes outward more greatly than other parts. In this case, the mating locking arm 112*d* is deflected due to the small gaps between the tip portions 112*f*-1 of the restriction protrusions 112*f* and the erroneous operation restriction portions 124. Thereafter, the tip portions 112*f*-1 of the restriction protrusions 112*f* will immediately come into contact with the erroneous operation restriction portions 124, so that further deflection will be restricted.

Here, as described above, in the fully locked state, the CPA-side restriction protrusions 123 of the CPA member 12 locks to the front sides, in the movement direction D12, of the restriction protrusions 112*f* on the side of the housing 11*a* to restrict return movement opposite from the movement direction D12. At this occasion, in the present embodiment, the housing-side-inclined surfaces 112*f*-2 are formed on the front side, in the movement direction D12, of the restriction protrusions 112*f*, and each housing-side-inclined surface 112*f*-2, together with the corresponding mating locking arm 112*d*, form a hook shape.

As illustrated in FIG. 7, on the rear side in the movement direction D12, each of the CPA-side restriction protrusions 123 is formed with a CPA-side inclined surface 123*a* the distance of which from the mating locking arm 112*d* increases toward the movement direction D12. During restriction of the return movement, the rear side, in the movement direction D12, of the CPA-side restriction protrusions 123 enters the inside of the hook shape to lock thereto so that the CPA-side inclined surfaces 123*a* come into surface contact with the housing-side-inclined surfaces 112*f*-2.

Here, in order to release the mating between the connector 1 and the mating connector 2, first, the CPA member 12 in the fully locked state is returned back to the temporarily locked state before release of mating between the connectors. As described above, returning back to the temporarily locked state is performed by returning the CPA member 12 in the direction opposite to the movement direction D12 after the full lock release-receiving portion 122*b* is operated to release the full lock. The returning at this occasion is performed while the CPA arm 122 is deflected by operating the full lock release-receiving portion 122*b* to cause the CPA-side restriction protrusions 123 to come out of contact with the restriction protrusions 112*f*. Once the CPA member 12 is returned back to the temporarily locked state, the mating locking arm 112*d* becomes deflection-deformable as follows.

Figure 9:
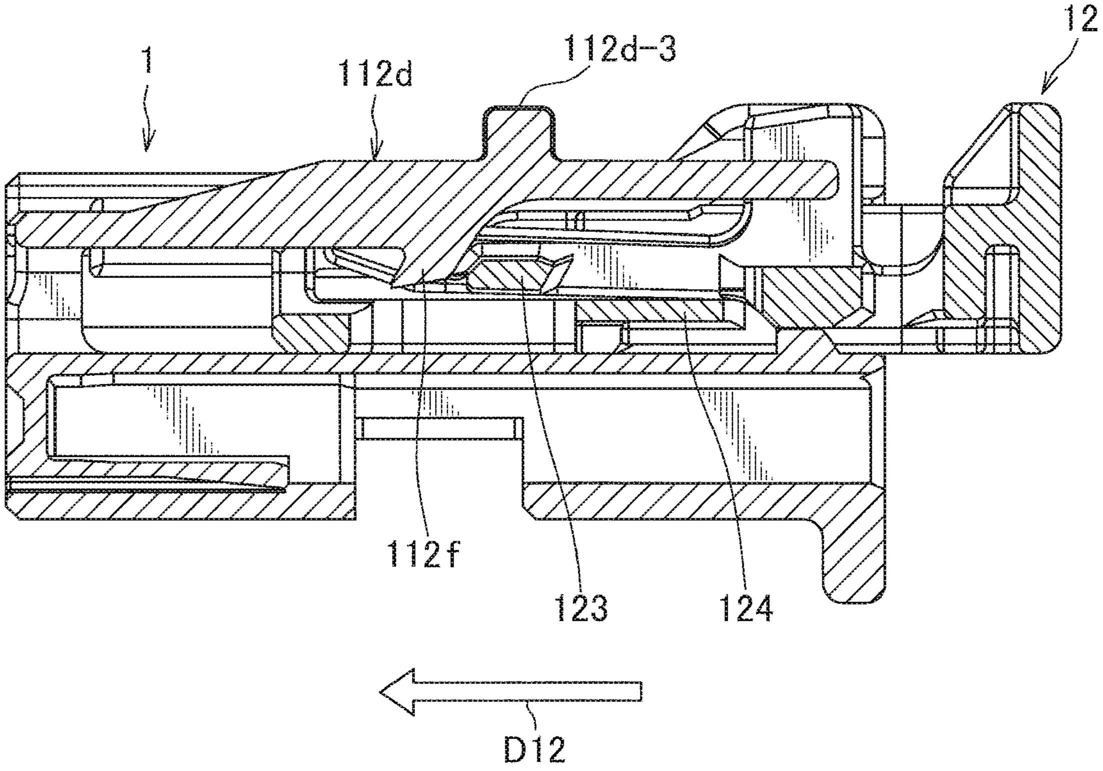
FIG. 9 is a sectional view, taken along a plane passing through the mating locking arm, illustrating that the CPA member is returned back to the temporarily locked state in the connector, and accordingly, the mating locking arm becomes deflection-deformable.

FIG. 9 is a sectional view, taken along a plane passing through the mating locking arm, illustrating that the CPA member is returned back to the temporarily locked state in the connector, and accordingly, the mating locking arm becomes deflection-deformable.

As illustrated in FIG. 9, once the CPA member 12 is returned back to the temporarily locked state in the connector 1, the erroneous operation restriction portions 124 are detached from immediately under the restriction protrusions 112*f*. At this occasion, the CPA-side restriction protrusions 123 pass immediately under the restriction protrusions 112*f* to be situated on the rear side in the movement direction D12. Because the erroneous operation restriction portions 124 are detached from immediately under the restriction protrusions 112*f*, deflection restriction by the restriction protrusions 112*f* is released to allow the mating locking arm 112*d* to make deflection deformation. When a push operation is performed on the lock release operation-receiving portion 112*d*-3 in this state, the mating locking arm 112*d* is deflected, and the mating-side lock portion 21 of the mating connector 2 comes out of contact with the locking end face 112*d*-2*a* of the locking bridge 112*d*-2, so that the mating can be released.

According to the connector 1 of the embodiment described above, if, during use without the CPA member 12, excessive deflection exceeding the deflection deformation of the mating locking arm 112*d* is likely to occur during mating, such excessive deflection is restricted as follows. Specifically, during use without the CPA member 12, the tip portions 112*f*-1 of the restriction protrusions 112*f* provided on the mating locking arm 112*d* come into contact with the CPA movement surface 112*a* to restrict excessive deflection. With the function of this restriction protrusion 112*f*, the deflection of the mating locking arm 112*d* can be alleviated during use without the CPA member 12.

Here, in the present embodiment, the CPA-side restriction protrusions 123 protrude in the width direction D13 from the CPA arm 122 of the CPA member 12, and in the fully locked state, the CPA-side restriction protrusions 123 lock to the front sides, in the movement direction D12, of the restriction protrusions 112*f* to restrict the return movement opposite from the movement direction D12. According to this configuration, during use with the CPA member 12, in the fully locked state after mating with the mating connector 2, the CPA-side restriction protrusions 123 lock to the restriction protrusions 112*f* on the side of the housing 11*a*, so that return movement opposite from the movement direction D12 is restricted. The restriction of the return movement in the fully locked state effectively alleviates, e.g., an occurrence of unintended transition of the CPA member 12 into the temporarily locked state to result in failure of mating with the mating connector 2.

Furthermore, in the present embodiment, the restriction protrusions 112*f*, constituting the pair, in the housing 11*a* are provided such that the CPA arm 122 is interposed in the width direction D13 between the two restriction protrusions 112*f*. In addition, the CPA-side restriction protrusions 123 constituting the pair are provided to protrude in the width direction D13 from the respective side edges, constituting the pair, of the CPA arm 122. In the fully locked state, the CPA-side restriction protrusions 123 constituting the pair lock to, in a one-to-one manner, the respective restriction protrusions 112*f* constituting the pair. According to this configuration, the CPA-side restriction protrusions 123, provided to constitute the pair in the width direction D13, lock to the restriction protrusions 112*f*, likewise provided to constitute the pair in the width direction D13, in a one-to-one manner, so that the return movement of the CPA member 12 can be restricted in a well-balanced manner while alleviating inclination in the width direction D13.

Furthermore, in the present embodiment, the housing-side-inclined surfaces 112*f*-2 are formed on the front side, in the movement direction D12, of the restriction protrusions 112*f*, and each housing-side-inclined surface 112*f*-2, together with the corresponding mating locking arm 112*d*, form a hook shape. On the rear side in the movement direction D12, each of the CPA-side restriction protrusions 123 is formed with a CPA-side inclined surface 123*a*. During restriction of the return movement, the rear side, in the movement direction D12, of the CPA-side restriction protrusions 123 enters the inside of the hook shape to lock thereto so that the CPA-side inclined surfaces 123*a* come into surface contact with the respective housing-side-inclined surfaces 112*f*-2. According to this configuration, the rear side, in the movement direction D12, of the CPA-side restriction protrusions 123 enters the inside of the hook shape constituted by the mating locking arm 112*d* and the restriction protrusion 112*f* to lock thereto, so that the locking strength can be improved.

Furthermore, in the present embodiment, the mating locking arm 112*d* is provided with the lock release operation-receiving portion 112*d*-3, and the CPA member 12 includes the erroneous operation restriction portions 124. The erroneous operation restriction portions 124 are formed at such positions that the restriction protrusions 112*f* can come into contact with the erroneous operation restriction portions 124 in the fully locked state and that the restriction protrusion 112*f* come out of contact with the erroneous operation restriction portions 124 in the temporarily locked state. The erroneous operation restriction portions 124 do not hinder deflection of the mating locking arm 112*d* for locking the mating-side lock portion 21 and the locking bridge 112*d*-2 in the temporarily locked state. Furthermore, in the fully locked state, the erroneous operation restriction portions 124 restrict deflection of the mating locking arm 112*d* when an erroneous operation is performed on the lock release operation-receiving portion 112*d*-3. According to this configuration, a contact between the restriction protrusions 112*f* and the erroneous operation restriction portions 124 of the CPA member 12 can effectively restrict deflection of the mating locking arm 112*d* when an erroneous operation is performed on the lock release operation-receiving portion 112*d*-3 in the fully locked state. Furthermore, because deflection of the mating locking arm 112*d*, which occurs when an erroneous operation is performed, is restricted, an occurrence of, e.g., unintended release of locking with the mating connector 2 during mating can be alleviated.

Furthermore, in the present embodiment, the restriction protrusions 112*f*, constituting the pair, is provided on the mating locking arm 112*d*, and the erroneous operation restriction portions 124, constituting the pair, are provided to extend inward from the respective side frame portions 121*b*, constituting the pair, of the CPA member 12. In the fully locked state, the restriction protrusions 112*f* constituting the pair can come into contact with the erroneous operation restriction portions 124 constituting the pair. According to this configuration, the restriction protrusions 112*f*, provided to constitute the pair in the width direction D13, come into contact with the erroneous operation restriction portions 124, likewise provided to constitute the pair in the width direction D13, in a one-to-one manner, so that restriction can be achieved in a well-balanced manner while alleviating the inclination of the CPA member 12 about the axis.

Note that the embodiments described above merely illustrate typical forms of the connector. The connector is not limited thereto, and can be implemented with various modifications.

For example, according to the above-described embodiment, the connector 1 used as an end portion connector of a wire harness mounted on a vehicle or the like is illustrated as an example of the connector. However, the connector is not limited thereto, and the specific target of application can be anything.

Furthermore, according to the above-described embodiment, the housing 11*a* having an appearance of a rectangular block is illustrated as an example of the housing. However, the housing is not limited thereto, and any shape may be adopted as a specific external shape and the like.

Furthermore, according to the above-described embodiment, the connector 1 in which the CPA-side restriction protrusions 123 protruding from the CPA arm 122 locks to the restriction protrusions 112*f* in the fully locked state to restrict the return movement of the CPA member 12 is illustrated as an example of the connector. However, the connector is not limited thereto, and the CPA member may not be provided with the CPA-side restriction protrusions, and the restriction protrusions may achieve its role only when the connector is used without the CPA member. However, when the CPA-side restriction protrusions 123 lock to the restriction protrusions 112*f* in the fully locked state, an occurrence of, e.g., failure of mating with the mating connector 2 can be effectively alleviated, as described above.

Furthermore, according to the above-described embodiment, the connector 1 in which the CPA-side restriction protrusions 123 constituting the pair lock to, in a one-to-one manner, the respective restriction protrusions 112*f* constituting the pair is illustrated as an example of the connector. However, the connector is not limited thereto, and even when the CPA-side restriction protrusions are provided, the number of CPA-side restriction protrusions provided and how they lock to the restriction protrusions may be set without limitation. However, when the CPA-side restriction protrusions 123 constituting the pair lock to, in a one-to-one manner, the respective restriction protrusions 112*f* constituting the pair, the return movement of the CPA member 12 can be restricted in a well-balanced manner while alleviating inclination in the width direction D13, as described above.

Furthermore, according to the above-described embodiment, the connector 1 in which the housing-side-inclined surfaces 112*f*-2 are formed on the restriction protrusions 112*f*, and the CPA-side inclined surfaces 123*a* are formed on the CPA-side restriction protrusions 123 is illustrated as an example of the connector. During restriction of the return movement of the CPA member 12, the end portions of the CPA-side restriction protrusions 123 on the side of the CPA-side inclined surfaces 123*a* enter the inside of the hook shape constituted by the housing-side-inclined surface 112*f*-2 of the restriction protrusion 112*f* and the mating locking arm 112*d*. However, the connector is not limited thereto, and any shape or aspect may be adopted for specific shapes of the restriction protrusions and the CPA-side restriction protrusions and specific aspect of locking during restriction of return movement. However, when the end portions of the CPA-side restriction protrusions 123 on the side of the CPA-side inclined surfaces 123*a* enter the inside of the hook shape constituted by the housing-side-inclined surface 112*f*-2 and the mating locking arm 112*d*, the strength of locking can be improved, as described above.

Furthermore, according to the above-described embodiment, the connector 1 in which the erroneous operation restriction portions 124 of the CPA member 12 restrict deflection of the mating locking arm 112*d* when an erroneous operation is performed on the lock release operation-receiving portion 112*d*-3 of the mating locking arm 112*d* is illustrated as an example of the connector. However, the connector is not limited thereto, and the erroneous operation restriction portions may not be provided on the CPA member. However, because deflection of the mating locking arm 112*d*, which occurs when an erroneous operation is performed, is restricted by the erroneous operation restriction portions 124 of the CPA member 12, an occurrence of, e.g., unintended release of locking with the mating connector 2 during mating can be alleviated, as described above.

Furthermore, according to the above-described embodiment, the connector 1 in which, in the fully locked state, the restriction protrusions 112*f* constituting the pair can come into contact with the erroneous operation restriction portions 124 constituting the pair is illustrated as an example of the connector. However, the connector is not limited thereto, and even when the erroneous operation restriction portions are provided, the number of erroneous operation restriction portions provided and how they come into contact with the restriction protrusions may be set without any limitation. However, when the restriction protrusions 112*f* constituting the pair can come into contact with the erroneous operation restriction portions 124 constituting the pair, restriction can be achieved in a well-balanced manner while alleviating the inclination of the CPA member 12 about the axis, as described above.

LIST OF REFERENCE SIGNS

1 connector
2 mating connector
11 connector body
11*a* housing
11*b* connector terminal
11*c* spacer
12 CPA member
21 mating-side lock portion
111 housing
111*a* cavity
112 CPA-receiving portion
112*a* CPA movement surface
112*b* CPA-receiving space
112*c* side wall ribs
112*d* mating locking arm
112*d*-1 arm portion

112*d*-2 locking bridge (locking portion)
112*d*-2*a* locking end face
112*d*-2*b* full lock-receiving portion
112*d*-3 lock release operation-receiving portion
112*e* housing-side temporary locking protrusion
112*f* restriction protrusion
112*f*-1 tip portion
112*f*-2 housing-side-inclined surface
121 CPA body
121*a* full lock operation-receiving portion
121*b* side frame portion
121*c* CPA-side temporary locking protrusion
122 CPA arm
122*a* end portion protrusion
122*a*-1 movement inhibition end face
122*a*-2 full lock end face
122*b* full lock release-receiving portion
123 CPA-side restriction protrusion
123*a* CPA-side inclined surface
124 erroneous operation restriction portion
D11 mating direction
D12 movement direction
D13 width direction
F11, F12 external force
W1 electric wire

What is claimed is:

1. A connector comprising:

a connector body in which a connector terminal is accommodated in a cavity of a housing; and a CPA member that can be attached to the housing in a temporarily locked state and configured to, when attached, inhibit movement in a movement direction along a mating direction before mating of the connector body with a mating connector, the CPA member being configured to, when the inhibition is released by the mating, transition to a fully locked state by moving in the movement direction, so that the CPA member guarantees the mating, wherein the housing includes:

a housing body provided with the cavity;

a CPA-receiving portion that defines, of an outer peripheral surface of the housing body, a CPA-receiving space for receiving the CPA member, with a bottom surface of the CPA-receiving space being a CPA movement surface on which the CPA member moves, the CPA member temporarily locking to the CPA-receiving portion in the temporarily locked state;

a mating locking arm being an arm portion that is disposed to face the CPA movement surface with the CPA-receiving space interposed therebetween and that extends in the mating direction, an intermediate portion in an extending direction of the mating locking arm being deflection-deformable toward the CPA movement surface, wherein, during mating with the mating connector, a portion of the mating connector locks to a locking portion provided on the intermediate portion while deflecting the intermediate portion, and the CPA member makes a full lock with the locking portion of the mating locking arm such that the locking portion is sandwiched between the portion of the mating connector and the CPA member in the movement direction; and a restriction protrusion protruding, from the intermediate portion of the mating locking arm to the CPA movement surface, by an amount of protrusion that does not hinder deflection deformation of the mating locking arm during the mating, wherein when excessive deflection exceeding the deflection deformation during the mating is likely to occur, a tip portion of the restriction protrusion comes into contact with the CPA movement surface to restrict the excessive deflection.

2. The connector according to claim 1, wherein the locking portion includes a locking end face defining a rear face of the locking portion in the movement direction, and a lock-receiving portion at a front side of the locking portion opposite to the locking end face, an inner surface of the locking portion connecting the locking end face and the lock-receiving portion, wherein, in the temporarily locked state, the CPA member is in contact with the locking end face such that the locking end face inhibits movement of the CPA member in the movement direction, wherein, during mating with the mating connector, the portion of the mating connector locks to the locking end face of the locking portion provided on the intermediate portion while deflecting the intermediate portion, and the CPA member moves in the movement direction from the locking end face along the inner surface and to the lock-receiving portion and makes a full lock with the locking portion of the mating locking arm.

3. The connector according to claim 1, wherein an upper surface of the locking portion is opposite to the inner surface and connects the locking end face and the lock-receiving portion, and wherein, during the mating with the mating connector, the portion of the mating connector moves from the lock-receiving portion of the locking portion along the upper surface and locks to the locking end face of the locking portion.

4. A connector comprising:

a connector body in which a connector terminal is accommodated in a cavity of a housing; and a CPA member that can be attached to the housing in a temporarily locked state and configured to, when attached, inhibit movement in a movement direction along a mating direction before mating of the connector body with a mating connector, the CPA member being configured to, when the inhibition is released by the mating, transition to a fully locked state by moving in the movement direction, so that the CPA member guarantees the mating, wherein the housing includes:

a housing body provided with the cavity;

a CPA-receiving portion that defines, of an outer peripheral surface of the housing body, a CPA-receiving space for receiving the CPA member, with a bottom surface of the CPA-receiving space being a CPA movement surface on which the CPA member moves, the CPA member temporarily locking to the CPA-receiving portion in the temporarily locked state;

a mating locking arm being an arm portion that is disposed to face the CPA movement surface with the CPA-receiving space interposed therebetween and that extends in the mating direction, an intermediate portion in an extending direction of the mating locking arm being deflection-deformable toward the CPA movement surface, wherein, during mating with the mating connector, a portion of the mating connector locks to a locking portion provided on the intermediate portion while deflecting the intermediate portion, and the CPA member makes a full lock with the mating locking arm; and a restriction protrusion protruding, from the intermediate portion of the mating locking arm to the CPA movement surface, by an amount of protrusion that does not hinder deflection deformation of the mating locking arm during the mating, wherein when excessive deflection exceeding the deflection deformation during the mating is likely to occur, a tip portion of the restriction protrusion comes into contact with the CPA movement surface to restrict the excessive deflection, and wherein the CPA member includes:

a CPA body configured to temporarily lock to the CPA-receiving portion, wherein a rear side, in the movement direction, of the CPA body receives a transition operation to the fully locked state;

a CPA arm being a cantilever extending from the CPA body in the movement direction, wherein before the mating, an end portion on a free end side of the CPA arm inhibits the movement by coming into contact with the locking portion, and when the inhibition is released by the mating, the end portion makes a full lock with the locking portion; and a CPA-side restriction protrusion protruding in a width direction of the CPA arm from an intermediate position between a fixed end side and the free end side of the CPA arm, wherein in the fully locked state, the CPA-side restriction protrusion locks to a front side, in the movement direction, of the restriction protrusion to restrict return movement opposite from the movement direction.

5. The connector according to claim 4, wherein a pair of restriction protrusions of the housing is provided such that the CPA arm is interposed in the width direction between the two restriction protrusions constituting the pair, a pair of CPA-side restriction protrusions is provided so as to protrude in the width direction from the intermediate position on respective side edges, constituting a pair, of the CPA arm, and in the fully locked state, the CPA-side restriction protrusions constituting the pair lock to, in a one-to-one manner, the restriction protrusions constituting the pair.

6. The connector according to claim 4, wherein a housing-side-inclined surface, the distance of which from the mating locking arm increases toward the movement direction, is formed on a front side, in the movement direction, of the restriction protrusion, the housing-side-inclined surface, together with the mating locking arm, form a hook shape, and a CPA-side inclined surface, the distance of which from the mating locking arm increases toward the movement direction, is formed on a rear side, in the movement direction, of the CPA-side restriction protrusion, and during restriction of the return movement, the rear side, in the movement direction, of the CPA-side restriction protrusion enters an inside of the hook shape to lock thereto so that the CPA-side inclined surface comes into surface contact with the housing-side-inclined surface.

7. A connector comprising:

a connector body in which a connector terminal is accommodated in a cavity of a housing; and a CPA member that can be attached to the housing in a temporarily locked state and configured to, when attached, inhibit movement in a movement direction along a mating direction before mating of the connector body with a mating connector, the CPA member being configured to, when the inhibition is released by the mating, transition to a fully locked state by moving in the movement direction, so that the CPA member guarantees the mating, wherein the housing includes:

a housing body provided with the cavity;

a CPA-receiving portion that defines, of an outer peripheral surface of the housing body, a CPA-receiving space for receiving the CPA member, with a bottom surface of the CPA-receiving space being a CPA movement surface on which the CPA member moves, the CPA member temporarily locking to the CPA-receiving portion in the temporarily locked state;

a mating locking arm being an arm portion that is disposed to face the CPA movement surface with the CPA-receiving space interposed therebetween and that extends in the mating direction, an intermediate portion in an extending direction of the mating locking arm being deflection-deformable toward the CPA movement surface, wherein, during mating with the mating connector, a portion of the mating connector locks to a locking portion provided on the intermediate portion while deflecting the intermediate portion, and the CPA member makes a full lock with the mating locking arm; and a restriction protrusion protruding, from the intermediate portion of the mating locking arm to the CPA movement surface, by an amount of protrusion that does not hinder deflection deformation of the mating locking arm during the mating, wherein when excessive deflection exceeding the deflection deformation during the mating is likely to occur, a tip portion of the restriction protrusion comes into contact with the CPA movement surface to restrict the excessive deflection, wherein the mating locking arm is formed with, on an opposite side from a mating side as seen from the locking portion, a lock release operation-receiving portion configured to receive a lock release operation for deflecting the intermediate portion toward the CPA movement surface in order to release locking between a portion of the mating connector and the locking portion during the mating, and wherein the CPA member includes an erroneous operation restriction portion that is formed at such a position that the restriction protrusion can come into contact with the erroneous operation restriction portion in the fully locked state and that the restriction protrusion comes out of contact with the erroneous operation restriction portion in the temporarily locked state, and the erroneous operation restriction portion being configured such that in the temporarily locked state, the erroneous operation restriction portion does not hinder deflection of the mating locking arm for the locking the portion of the mating connector and the locking portion, and in the fully locked state, the erroneous operation restriction portion restricts deflection of the mating locking arm when the lock release operation-receiving portion receives an erroneous operation before the CPA member transitions to the temporarily locked state.

8. The connector according to claim 7, wherein a pair of restriction protrusions is provided such that, on the mating locking arm, the restriction protrusions are situated in proximity to respective side edges, constituting a pair, extending along the movement direction, the CPA member includes a pair of side frame portions that is arranged such that, in the fully locked state, the mating locking arm is interposed between the two side frame portions, constituting the pair, in a top view of the CPA movement surface, and a pair of erroneous operation restriction portions is provided such that the two erroneous operation restriction portions, constituting the pair, extend inward from the two side frame portions, constituting the pair, so as to be able to be contacted by the respective restriction protrusions, constituting the pair, in the fully locked state.

* * * * *